US009198186B2

United States Patent
Jung et al.

(10) Patent No.: US 9,198,186 B2
(45) Date of Patent: Nov. 24, 2015

(54) APPARATUS AND METHOD FOR OPERATING RESOURCES IN COMMUNICATION SYSTEM

(71) Applicant: Samsung Electronics Co. Ltd., Suwon-si, Gyeonggi-do (KR)

(72) Inventors: Jung-Soo Jung, Seongnam-si (KR); Rakesh Taori, Suwon-si (KR); Su-Ryong Jeong, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 178 days.

(21) Appl. No.: 13/933,367

(22) Filed: Jul. 2, 2013

(65) Prior Publication Data

US 2014/0004897 A1 Jan. 2, 2014

(30) Foreign Application Priority Data

Jul. 2, 2012 (KR) ........................ 10-2012-0071767

(51) Int. Cl.
*H04W 16/14* (2009.01)
*H04W 72/08* (2009.01)
*H04B 7/04* (2006.01)
*H04B 7/06* (2006.01)

(52) U.S. Cl.
CPC ........... *H04W 72/082* (2013.01); *H04B 7/0413* (2013.01); *H04B 7/0617* (2013.01)

(58) Field of Classification Search
CPC ..... H04W 24/10; H04W 24/08; H04W 24/02; H04W 36/14; H04W 36/0083; H04W 36/0088; H04W 34/04; H04W 72/082; H04W 64/00; H04W 84/045; H04W 36/30; H04W 16/14; H04B 17/0077

USPC ............ 455/62, 63.1, 67.11, 278.1; 370/329, 370/341

See application file for complete search history.

(56) References Cited

U.S. PATENT DOCUMENTS

| 5,457,680 | A | * | 10/1995 | Kamm et al. ................. 370/332 |
| 5,673,259 | A | * | 9/1997 | Quick, Jr. ...................... 370/342 |
| 5,931,964 | A | * | 8/1999 | Beming et al. ................ 714/748 |
| 6,072,988 | A | * | 6/2000 | Minegishi ....................... 455/62 |

(Continued)

FOREIGN PATENT DOCUMENTS

WO 2011/145857 A2 11/2011

OTHER PUBLICATIONS

Doppler, Klaus et al., Device to-Device Communications as an Underlay to LTE-Advanced Networks, IEEE Communications Magazine, Dec. 2009, pp. 42-49.

(Continued)

*Primary Examiner* — Minh D Dao
(74) *Attorney, Agent, or Firm* — Jefferson IP Law, LLP

(57) ABSTRACT

A method for operating resources by a base station in a communication system is provided. The method includes transmitting at least one beam to at least one terminal, receiving strength information of the at least one beam from the at least one terminal, determining at least one of resources which are not used for communication between the at least one terminal and the base station, and resources, whose interference to communication between the base station and the at least one terminal is less than or equal to a predetermined threshold, based on the strength information of the at least one beam, and allocating the determined resources as resources for communication which is performed between terminals without the base station.

24 Claims, 15 Drawing Sheets

(56) References Cited

U.S. PATENT DOCUMENTS

| | | | |
|---|---|---|---|
| 6,137,991 A * | 10/2000 | Isaksson | 455/67.11 |
| 2004/0157611 A1* | 8/2004 | Smith et al. | 455/445 |
| 2004/0198234 A1* | 10/2004 | Wacker et al. | 455/67.13 |
| 2005/0070285 A1* | 3/2005 | Goransson | 455/436 |
| 2008/0279204 A1* | 11/2008 | Pratt et al. | 370/406 |
| 2009/0011770 A1 | 1/2009 | Jung et al. | |
| 2009/0023462 A1 | 1/2009 | Dent | |
| 2009/0258654 A1 | 10/2009 | Hagerman | |
| 2010/0195527 A1 | 8/2010 | Gorokhov et al. | |
| 2011/0212731 A1* | 9/2011 | Lee et al. | 455/450 |
| 2012/0108179 A1* | 5/2012 | Kasslin et al. | 455/67.13 |
| 2012/0146788 A1* | 6/2012 | Wilson et al. | 340/539.23 |
| 2012/0163309 A1* | 6/2012 | Ma et al. | 370/329 |
| 2012/0257585 A1* | 10/2012 | Sydor et al. | 370/329 |
| 2013/0064146 A1 | 3/2013 | Ahn et al. | |
| 2013/0083661 A1* | 4/2013 | Gupta et al. | 370/235 |
| 2014/0146863 A1* | 5/2014 | Seol et al. | 375/224 |
| 2014/0323143 A1* | 10/2014 | Jung et al. | 455/452.1 |

OTHER PUBLICATIONS

Doppler, Klaus et al., Device to-Device communications; functional prospects for LTE-Advanced networks, Jun. 2009, pp. 1-6.

Yu, Chia-Hao et al., Power optimization of device-to-device communication underlaying cellular communication, IEEE ICC 2009, Jun. 2009, pp. 1-5.

* cited by examiner

APPARATUS AND METHOD FOR OPERATING RESOURCES IN COMMUNICATION SYSTEM

CROSS REFERENCE TO RELATED APPLICATION(S)

This application claims the benefit under 35 U.S.C. §119 (a) of a Korean patent application filed on Jul. 2, 2012 in the Korean Intellectual Property Office and assigned Serial No. 10-2012-0071767, the entire disclosure of which is hereby incorporated by reference.

TECHNICAL FIELD

The present disclosure relates to an apparatus and method for operating resources in a communication system. More particularly, the present disclosure relates to an apparatus and method for operating resources to increase the efficiency of transmission and reception in a communication system.

BACKGROUND

In line with the exponential increase in the average amount of data used by mobile users, there is an increasing user demand for higher data rates. Methods capable of providing a high data rate may be roughly classified into a method of performing communication using a wider frequency band and a method of increasing the frequency usage efficiency. The latter method has a lot of difficulty in providing a higher average data rate since it is hard to further increase the frequency usage efficiency through the technology improvements as the currently available communication technologies have already provided the frequency usage efficiency close to its theoretical limit. Therefore, an efficient way to increase the data rate is to provide data services over a wider frequency band.

In order to provide data services over a wide frequency band, available frequency bands need to be considered, and millimeter-wave bands of 30 GHz or higher are commonly used, because the bands of 1 GHz or higher, capable of broadband communication, are limited. In these high frequency bands, unlike in the 2 GHz band used by the cellular systems according to the related art, the signal attenuation may significantly increase with the increase in the distance, causing a significant reduction in service coverage of a base station.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide an apparatus and method for operating resources to increase the efficiency of transmission and reception in a communication system.

Another aspect of the present disclosure is to provide an apparatus and method for operating resources to allow terminals to communicate with each other without a base station in a communication system.

Another aspect of the present disclosure is to provide an apparatus and method for operating resources to allow a base station to efficiently transmit resource allocation information to a terminal in a communication system.

In accordance with an aspect of the present disclosure, a method for operating resources by a base station in a communication system is provided. The method includes transmitting at least one beam to at least one terminal, receiving strength information of the at least one beam from the at least one terminal, determining at least one resource which is not used for communication between the at least one terminal and the base station, and resources, whose interference to communication between the base station and the at least one terminal is less than or equal to a predetermined threshold, based on the strength information of the at least one beam, and allocating the determined resources as resources for communication which is performed between terminals without the base station.

In accordance with another aspect of the present disclosure, a method for operating resources by a terminal in a communication system is provided. The method includes receiving at least one beam from a base station, measuring a strength of the at least one beam, transmitting information about the strength of the at least one beam to the base station, and receiving, from the base station, at least one resource which is not used for communication between at least one terminal and the base station and resources whose interference to communication between the base station and the at least one terminal is less than or equal to a predetermined threshold, wherein the at least one resource is determined and allocated by the base station based on the information about the strength of the at least one beam.

In accordance with another aspect of the present disclosure, an apparatus for operating resources by a base station in a communication system is provided. The apparatus includes a transmitter configured to transmit at least one beam to at least one terminal, a receiver configured to receive strength information of the at least one beam from the at least one terminal, and a controller configured to determine at least one resource which is not used for communication between the at least one terminal and the base station, and resources, whose interference to communication between the base station and the at least one terminal is less than or equal to a predetermined threshold, based on the strength information of the at least one beam, and to allocate the determined resources as resources for communication which is performed between terminals without the base station.

In accordance with another aspect of the present disclosure, an apparatus for operating resources by a terminal in a communication system is provided. The apparatus includes a receiver configured to receive at least one beam from a base station, a transmitter configured to measure a strength of the at least one beam, and to transmit information about the strength of the at least one beam to the base station, and a controller configured to receive, from the base station, at least one resource which is not used for communication between at least one terminal and the base station and resources whose interference to communication between the base station and the at least one terminal is less than or equal to a predetermined threshold, and to control communication with another terminal using the received resources, wherein the at least one resource is determined and allocated by the base station based on the information about the strength of the at least one beam.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding, but these are to be regarded as merely exemplary. Accordingly, those of ordinary skilled in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the present disclosure. Accordingly, it should be apparent to those skilled in the art that the following description of various embodiments of the present disclosure is provided for illustration purposes only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
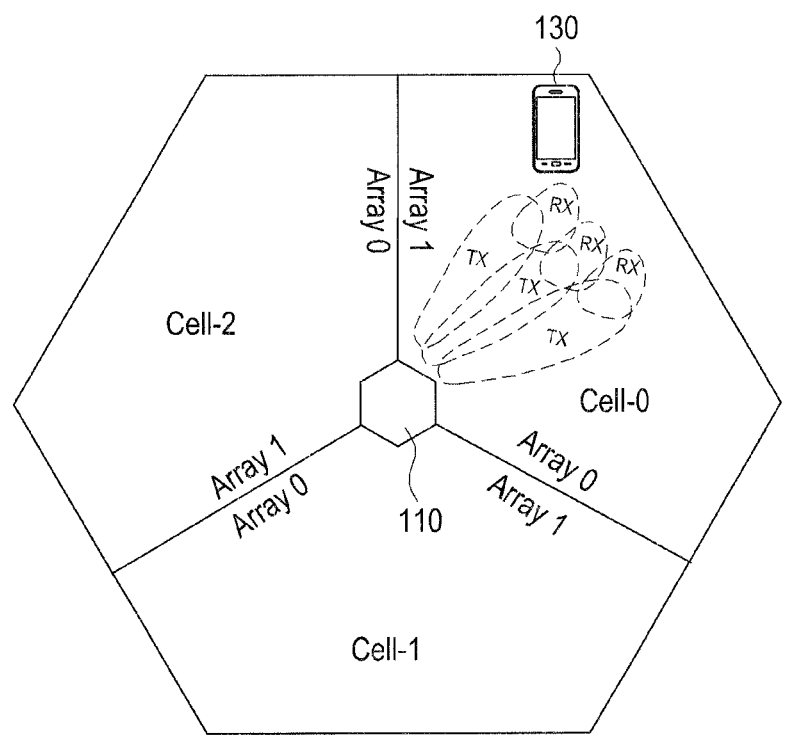
FIG. 1 illustrates a terminal and a base station providing beamforming using array antennas in a communication system according to an embodiment of the present disclosure.

FIG. 1 illustrates a terminal and a base station providing beamforming using array antennas in a communication system according to an embodiment of the present disclosure.

Referring to FIG. 1, the base station 110 may transmit data in each cell by switching a direction of a DownLink (DL) Transmit (Tx) beam using a plurality of array antennas Array0 and Array1, and the terminal 130 may receive data by switching a direction of a Receive (Rx) beam.

When using the beam forming technique, the base station 110 and the terminal 130 provide data services by selecting directions of the Tx and Rx beams showing the optimal channel environment among the directions of the Tx and Rx beams. The same technique may be applied not only to a DL channel carrying data from the base station 110 to the terminal 130, but also to an UpLink (UL) channel carrying data from the terminal 130 to the base station 110.

Assuming that the number of directions of the Tx beams in which the base station 110 can transmit data is N, and the number of directions of the Rx beams in which the terminal 130 can receive data is M, in order to select the optimal DL Tx/Rx directions, the base station 110 transmits a predetermined signal in each of N available Tx directions at least M times, and the terminal 130 receives each of the N Tx beams using M Rx beams. In this way, the base station 110 may transmit a specific reference signal at least N×M times, and the terminal 130 may receive the reference signal N×M times, measure received strengths of the received signals, and determine the direction showing the highest measured strength among the N×M measured strengths as the optimal Tx/Rx beam direction.

The process in which the base station 110 transmits a signal in all of the base station 110's available Tx directions at least once will be referred to as 'beam sweeping', and the process in which the terminal 130 selects the optimal Tx/Rx beam direction will referred to as 'beam selection'. This optimal DL Tx/Rx beam selection process may be applied in the same way even to a UL Tx/Rx process for transmitting data from the terminal 130 to the base station 110.

Figure 2:
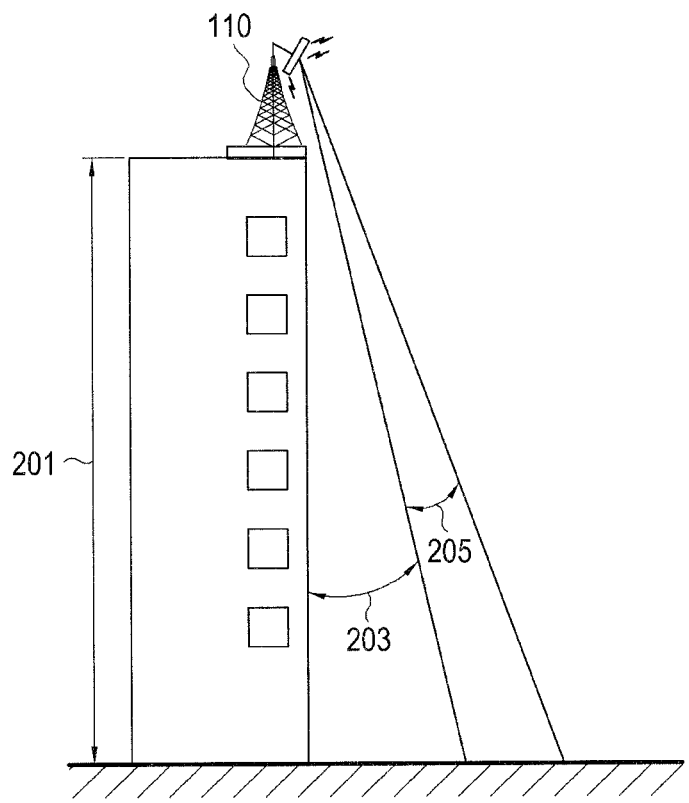
FIGS. 2 and 3 illustrate a base station that transmits signals through Tx beams having a specific beam width in performing communication using a beamforming technique in a communication system according to an embodiment of the present disclosure.
Figure 3:
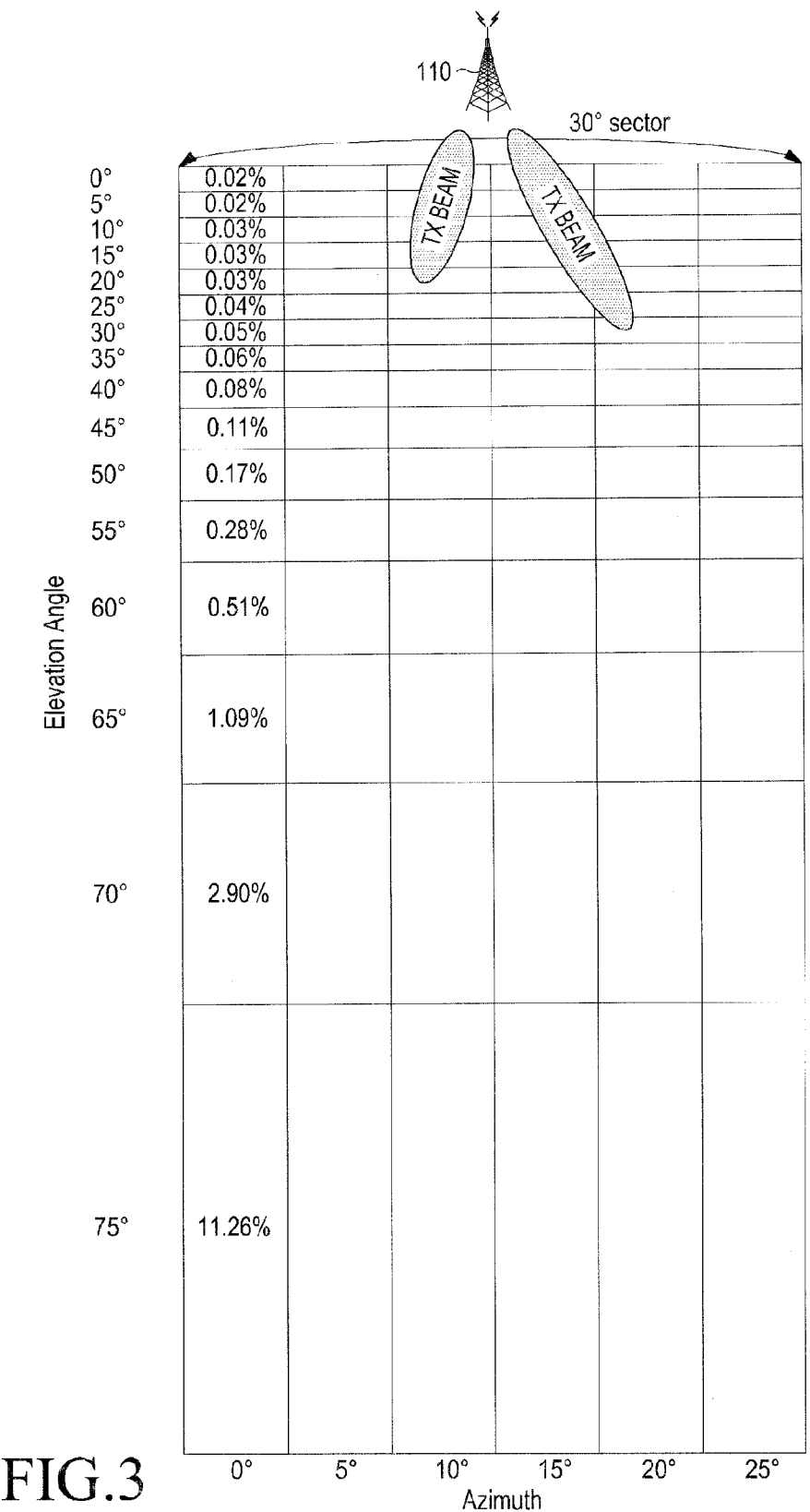

FIGS. 2 and 3 illustrate a base station that transmits signals through Tx beams having a specific beam width in performing communication using a beamforming technique in a communication system according to an embodiment of the present disclosure.

Referring to FIG. 2, the base station 110 is installed in the location of a specific height 201 and has a predetermined beam width 205. The beam width 205 of the base station 110 may be defined for each of the elevation angle and the azimuth. In the example given in FIG. 2, a Tx beam of the base station 110 is transmitted in a direction corresponding to a specific elevation angle 203.

FIG. 3 shows the number of Tx beams transmittable by the base station 110, on the assumption that in the example where the base station 110 is installed as in FIG. 2, the base station 110 has an installation height of 35 m and transmits Tx beams having a beam width of 5° for each of the elevation angle and the azimuth in one sector having an angle of 30° and coverage of 200 m. As illustrated in FIG. 3, one sector having an angle of 30° and coverage of 200 m may be configured using 96 Tx beams having a beam width of 5° for each of the elevation angle and the azimuth.

The Tx beams transmitted by the base station 110 are spread in the form of fan (or sector) when there is no obstacle. However, in the example of FIG. 3, each of the Tx beams will be assumed to arrive at the ground in the form of rectangle for convenience purpose only, and the rectangles represent 96 areas in which the Tx beams having specific azimuth and elevation angle have arrived at the ground. The 96 Tx beams are transmitted to farther areas as the elevation angle is greater, and as the TX beams are transmitted farther by the base station 110, their transmission distances are longer and they are received in wider areas.

A ratio written in each rectangle represents a ratio of an Rx area of a Tx beam that is transmitted to a specific location to the size of all of the 96 areas. As illustrated in FIG. 3, it can be understood that even for a Tx beam having the same elevation angle and azimuth, a Tx beam transmitted to the boundary area of the base station 110 is received in a wider area, compared to a Tx beam that is transmitted to an area close to the center of the base station 110. In FIG. 3 where the base station is assumed to have the height of 35 m and the coverage of 200 m, the largest Rx area may be a maximum of 480 times the size of the smallest Rx area.

If the base station 110 uses Tx beams having a narrow elevation angle and azimuth, a large number of Tx beams and Rx areas may exist. For example, when transmitting a DL synchronization channel and broadcast control channels by beam sweeping using narrow Tx beams, the base station 110 needs to repeatedly transmit the Tx beams in all of the narrow Tx beam directions one or more times, for a total of 96 times or more. The number of transmissions needed to transmit a DL synchronization channel and broadcast control channels by beam sweeping is proportional to the number of Tx beams existing in the coverage of the base station 110, so a way to reduce the Tx overhead of the DL synchronization channel and broadcast control channels in the base station 110 is to support the entire coverage of the base station 110 with a fewer number of Tx beams. To this end, a beam width of each Tx beam should be widened. However, as the beam width increases, the beamforming effects are lower, and if the beam width becomes narrower to increase the beamforming effects, the number of Tx beams required to support the entire coverage of the base station 110 becomes larger, causing an increase in the overhead required to transmit the broadcast-type channels.

A way to address this issue is to design a beam width used to transmit broadcast channels to be different from a beam width used to transmit user data. For example, a Tx beam having a beam width of 30° may be used as a Tx beam for transmitting broadcast channels in a sector of 60°, and a Tx beam having a beam width of 10° may be used as a Tx beam for transmitting user data. In the method of using a plurality of different beam widths, a Tx beam having a wide beam width will be referred to as a wide beam or a coarse beam, while a Tx beam having a narrow beam width will be referred to as a narrow beam or a fine beam.

Figure 4:
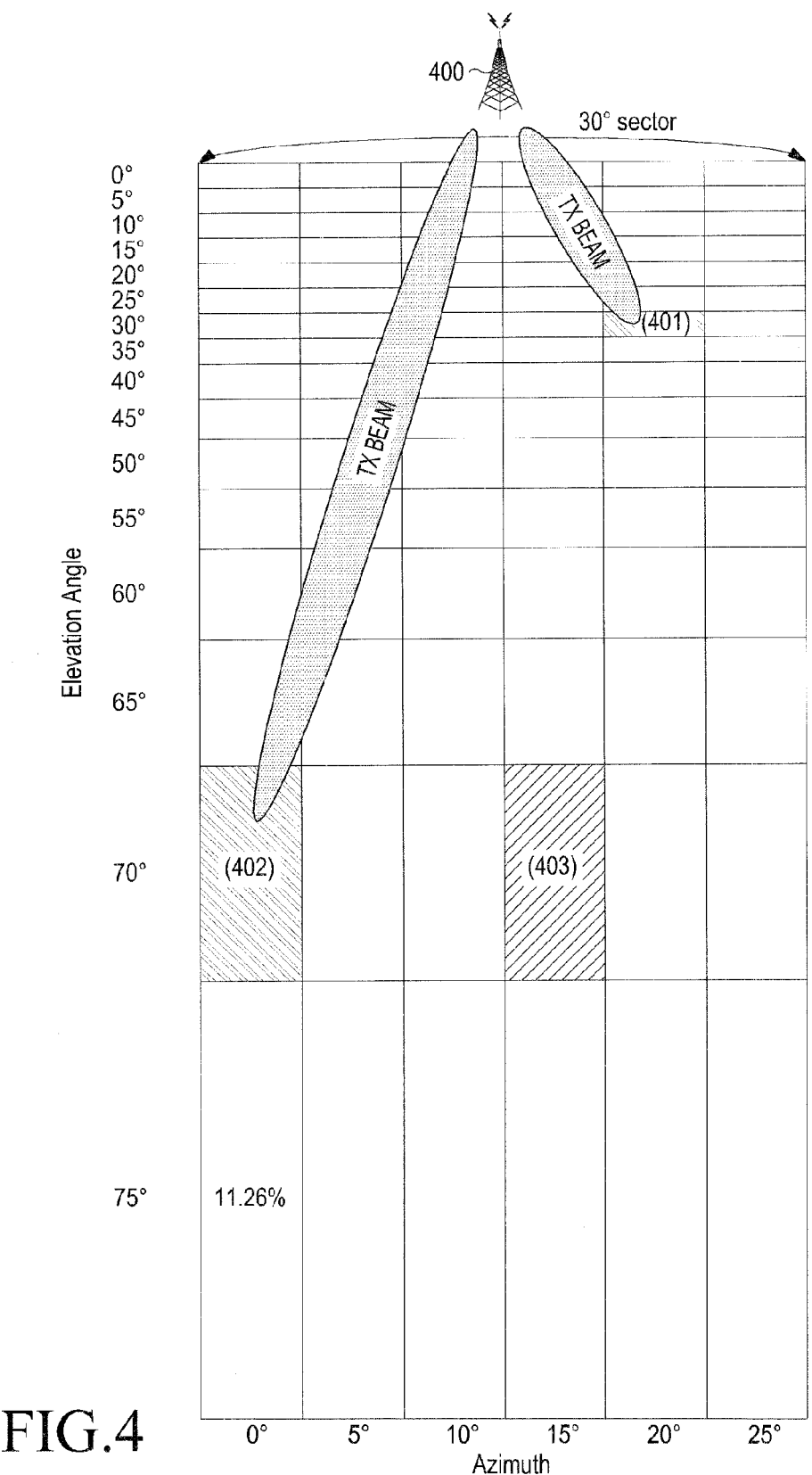
FIG. 4 illustrates how a base station schedules terminals located in different locations using different fine beams in a communication system according to another embodiment of the present disclosure.

FIG. 4 illustrates how a base station schedules terminals located in different locations using different fine beams in a communication system according to an embodiment of the present disclosure.

Referring to FIG. 4, according to an embodiment of the present disclosure, when scheduling a plurality of terminals, the base station 400 may identify the time, space, and frequency resources that are not used in scheduling, or that may not significantly interfere with the scheduled terminals, and use the identified resources for inter-terminal communication or relay communication. The space resources are not limited to the physical space resources, but may include information about a Multiple Input Multiple Output (MIMO) layer which may occur between transceivers of a base station and a terminal, antenna configuration information used in Tx/Rx antennas, and information about different beamformings formed by transceivers. In the case of beamforming, for example, if one or more Tx beams exist in the base station, the Tx beams or their patterns may be regarded as different space resources.

The term 'relay communication' as used herein may refer to communication between a base station and a terminal, or communication performed via one or more relay terminals. The term 'inter-terminal communication' as used herein may refer to communication that is performed only between terminals without the intervention of a base station. Both the relay communication and the inter-terminal communication will be referred to as 'local communication'. An operation in which the base station directly transmits data to terminals based on its scheduling will be referred to 'direct communication', which is distinguishable from the relay communication and the inter-terminal communication.

Referring to FIG. 4, the base station 400 is a base station that is installed in the same way as in FIG. 3, and schedules two terminals existing in different locations 401 and 402 at a certain time, using two different fine beams. Because the signal attenuation effects are significant in the millimeter-wave bands to which various embodiments of the present disclosure are applied, a signal of a Tx beam transmitted to the area 401 is received with lower power due to the signal attenuation as it goes far away from the area 401, and a signal of a Tx beam transmitted to the area 402 is also received with lower power due to the signal attenuation as it goes far away from the area 402. Accordingly, if the two areas, in which the Tx beams from the base station 400 are received, are spaced apart enough from each other spatially, interference between the two beams may be suppressed to a low level, making it possible to efficiently reuse the time and frequency resources.

An area (such as an area 403), that is quite far from the areas 401 and 402 to which the base station 400 has transmitted the two Tx beams, is a location where the two Tx beams and the time and frequency resources may be reused, since this area is a location where the interference with the two Tx beams transmitted to the areas 401 and 402 is limited to a low level. When the base station 400 schedules terminals at a certain time using beamforming, one or more spatial areas like the area 403, in which the interference with terminals, for which direct communication is scheduled, is limited to a low level, may exist in the coverage of the bases station 400. Terminals located in this area may perform local communication using the available time and frequency resources of the base station 400. The area in which the interference is limited to a low level refers to an area where the interference occurs to be lower than or equal to a predetermined threshold. As for the resources for local communication, all or some of the available time and frequency resources may be reused to minimize the interference to terminals for direct communication.

Figure 5:
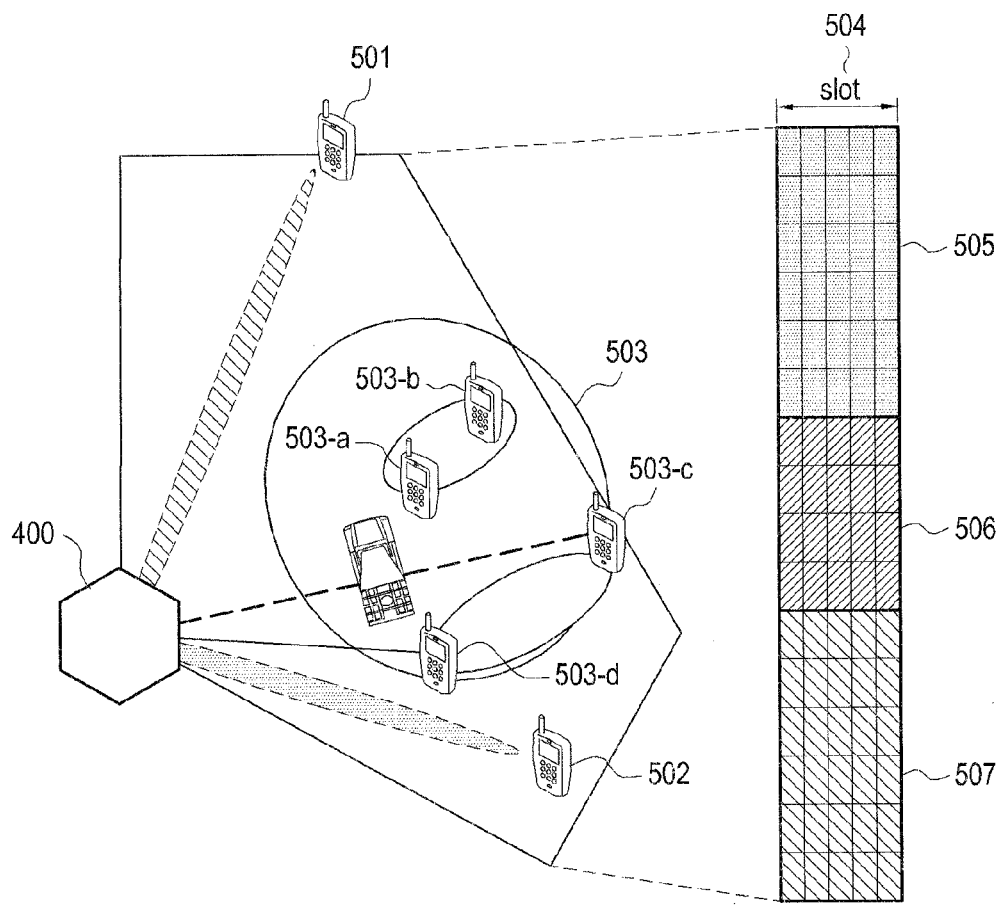
FIG. 5 illustrates how a base station performs scheduling for direct communication and local communication in a communication system according to another embodiment of the present disclosure.

FIG. 5 illustrates how a base station 400 performs scheduling for direct communication and local communication in a communication system according to another embodiment of the present disclosure.

Referring to FIG. 5, the areas serviced by the base station 400 may be divided into an area where a terminal #1 501 and a terminal #2 502, for which direct communication is scheduled, are located, and an area 503 where local communication is available. Local communication may be performed between a terminal #3 503-*a* and a terminal #4 503-*b*, and/or between a terminal #5 503-*c* and a terminal #6503-*d*, all of which are located in the area 503.

Local communication may be performed by reusing all or some of the available frequency resources, including the frequency resource areas scheduled for the terminal #1 501 and the terminal #2 502 which perform direct communication. For example, among the frequency areas of a specific time (slot) 504 scheduled for direct communication, an area 505 is a resource area scheduled for the terminal #2 502 and an area 507 is a resource area scheduled for the terminal #1 501. An area 506 may be used for local communication by preventing or minimizing overlapping with the areas 505 and 507. In other words, in another embodiment of the present disclosure, only selected some of the available frequency resource areas may be reused for local communication to minimize interference with the terminals, for which direct communication is scheduled.

Figure 6:
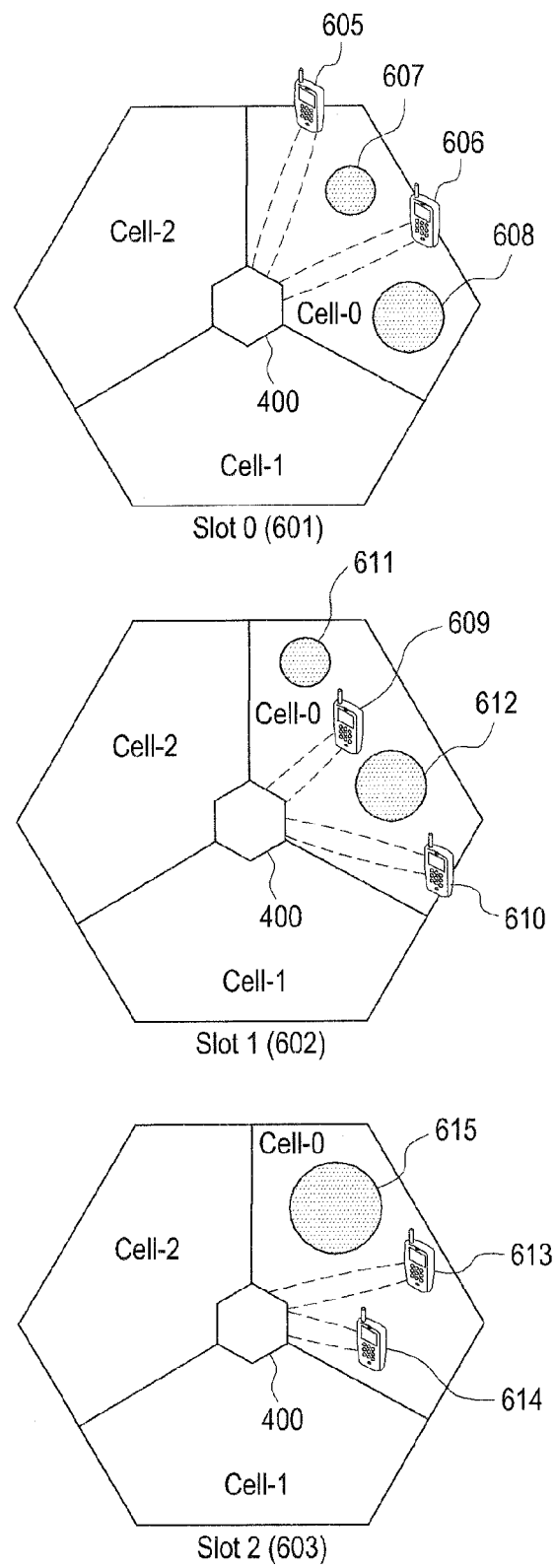
FIG. 6 illustrates how a base station schedules direct communication and local communication upon a change in communication environment in a communication system according to another embodiment of the present disclosure.

FIG. 6 illustrates how a base station schedules direct communication and local communication upon a change in communication environment in a communication system according to an embodiment of the present disclosure.

Referring to FIG. 6, since the base station 400 adaptively operates resources for direct communication depending on the communication environment, the spatial areas scheduled for local communication and the time and frequency resource areas allocated for local communication may adaptively vary depending on how the base station 400 schedules direct communication for terminals.

Referring to FIG. 6, a time slot #0 601 illustrates an example of scheduling direct communication for a terminal #1 605 and a terminal #2 606, and scheduling local communication for areas 607 and 608 where local communication is available. A time slot #1 602 illustrates an example of scheduling direct communication for a terminal #3 609 and a terminal #4 610 which are different from the terminals, for which direct communication was scheduled in the time slot #0 601, and thus scheduling local communication for areas 611 and 612 which are different from the areas 607 and 608 where local communication was available in the time slot #0 601. A time slot #2 603 illustrates an example of scheduling direct communication for a terminal #4 613 and a terminal #5 614 which are different from the terminals, for which direct communication was scheduled in the time slot #1 602, and thus scheduling local communication for a new area 615 where local communication is available. As such, the space resources used for local communication may dynamically vary in every scheduling time depending on how the base station 400 schedules direct communication.

In order to find the time, space, and frequency resources which do not cause interference of a predetermined threshold or more to the terminals performing direct communication, the base station 400 may use at least one of information about the base station 400's Tx beam-specific received signal strength (or reception performance) that all terminals in the base station 400's cell have measured and reported, information about interference between Tx beams, and information about at least one Tx/Rx beam used to transmit data to terminals performing direct communication. To this end, the base station 400 transmits a reference signal via each Tx beam in predetermined time and frequency areas. A terminal measures a received Tx beam-specific reference signal and reports information about the signal strength and interference between Tx beams to the base station 400. As the received signal strength information for Tx beams and the interference information between Tx beams, an average value measured over all the frequency resources may be reported, or a value measured for each frequency resource may be reported for each frequency resource. The base station 400 may determine Tx beams scheduled for local communication and information about frequency resources to be operated for local communication, using at least one of information about the base station 400's Tx beam-specific received signal strength that terminals have measured and reported, Tx beam-specific interference information, and information about at least one of Tx/Rx beams used to transmit data to terminals performing direct communication.

When the base station 400 has scheduled a specific terminal using a specific Tx beam, the base station 400 may determine, as an area where the interference by direct communication is limited, the Tx beam whose signal strength is less than or equal to a predetermined threshold or whose signal strength compared to that of Tx beams used for direct communication is less than or equal to a predetermined threshold, among the base station 400's Tx beams except for the specific Tx beam scheduled for direct communication, based on the information about the Tx beam-specific received signal strength measured and reported by the scheduled terminal, thereby operating the determined Tx beam for local communication.

When the base station 400 has scheduled direct communication for a plurality of terminals, the base station 400 may determine, as an area where the interference by direct communication is limited, the Tx beam whose signal strength is less than or equal to a predetermined threshold or whose signal strength compared to that of Tx beams used for direct communication is less than or equal to a predetermined threshold, based on any one (for example, the highest signal strength value) of the signal strength values that the scheduled terminals have independently measured and reported for the same Tx beam except for the Tx beams scheduled for direct communication, thereby operating the determined Tx beam for local communication. The base station 400 may determine, as terminals capable of performing local communication, the terminals that have reported the Tx beam operated for local communication as a Tx beam having the highest signal strength.

The base station 400 may determine an area where local communication is performed, using information about the base station 400's Tx beam-specific received signal strength that the terminal for local communication has reported, in addition to the Tx beam-specific received signal strength information of the terminal performing direct communication. The base station 400 determines that the interference to an area of a terminal by direct communication is limited, if received signal strength of Tx beams scheduled for direct communication out of the Tx beam-specific received signal strength information reported by terminals for local communication is less than or equal to a predetermined threshold, or if received signal strength of Tx beams scheduled for direct communication compared to the Tx beam having the highest reception performance is less than or equal to a predetermined threshold. The base station 400 thereby determines, as an area where local communication may be performed, the area where the terminal is located, or the area where the Tx beam is operated, that the terminal has reported as a Tx beam having the highest signal strength.

When operating a specific Tx beam for local communication, the base station 400 may operate, for local communication, the frequency area that minimizes overlapping of frequency resources with the terminals performing direct communication.

In a case where the base station 400 has operated local communication for specific Tx beam area and frequency resources, upon receiving related information, the terminals may determine that local communication has been operated for the terminals, if the Tx beam operated by the base station 400 for local communication has the highest received signal strength. Alternatively, the terminals may compare the received signal strength of the Tx beam operated by the base station 400 for local communication with the highest received signal strength of the Tx beam, and determine that local communication has been operated for the terminals, if the comparison results fall within a predetermined value.

Figure 7A:
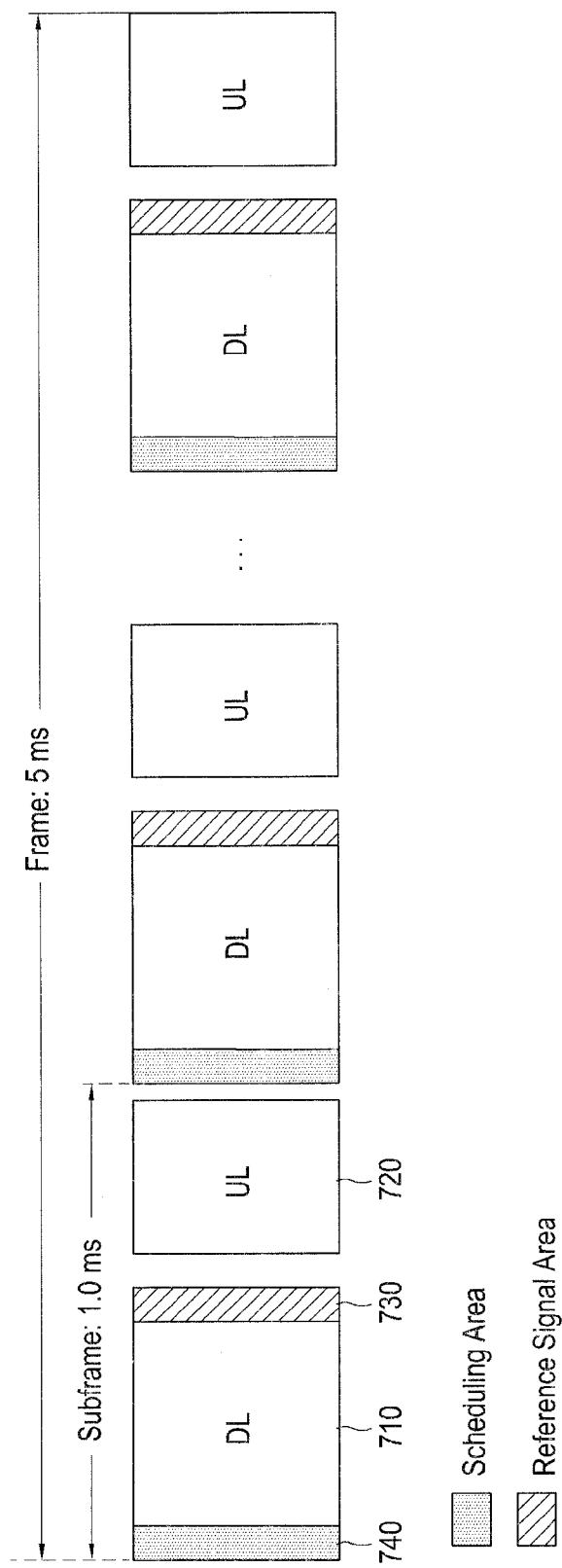
FIGS. 7A and 7B illustrate a frame structure used to transmit and receive signals in a communication system according to another embodiment of the present disclosure.
Figure 7B:
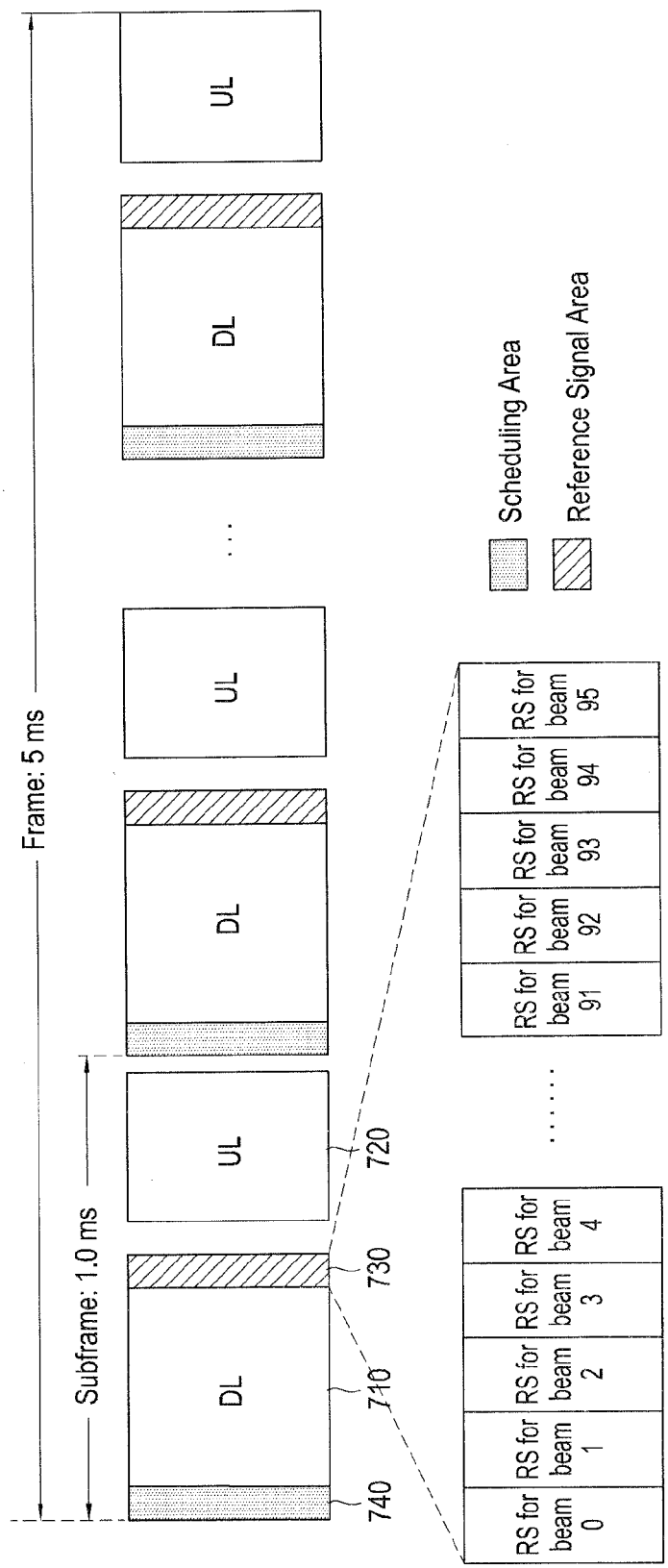

FIGS. 7A and 7B illustrate a frame structure used to transmit and receive signals in a communication system according to another embodiment of the present disclosure.

Referring to FIG. 7A, one frame has a length of 5 ms, and is comprised of five sub-frames, each of which may be divided into a DL Tx interval 710 carrying signals from a base station to a terminal, and a UL Tx interval 720 carrying signals from a terminal to a base station. Some of the DL Tx interval 710 may be used as a scheduling area 740 for carrying scheduling information, or may be used as an area 730 for carrying a DL reference signal.

A base station transmits a reference signal for each of its Tx beams in the reference signal area 730 more than once. For example, when performing beamforming using 96 Tx beams having a beam width of 5° at the elevation angle and azimuth, the base station transmits a reference signal for each of the 96 Tx beams in the reference signal area 730 at least once. For example, as illustrated in FIG. 7B, the base station transmits a reference signal for each of the 96 Tx beams in the reference signal area 730 once in every sub-frame.

A terminal receives each Tx beam-specific reference signal transmitted from the base station in the reference signal area 730 using one or more Rx beams, measures received signal strength for each Tx/Rx beam pair, and reports the measurements results to the base station.

Figure 8A:
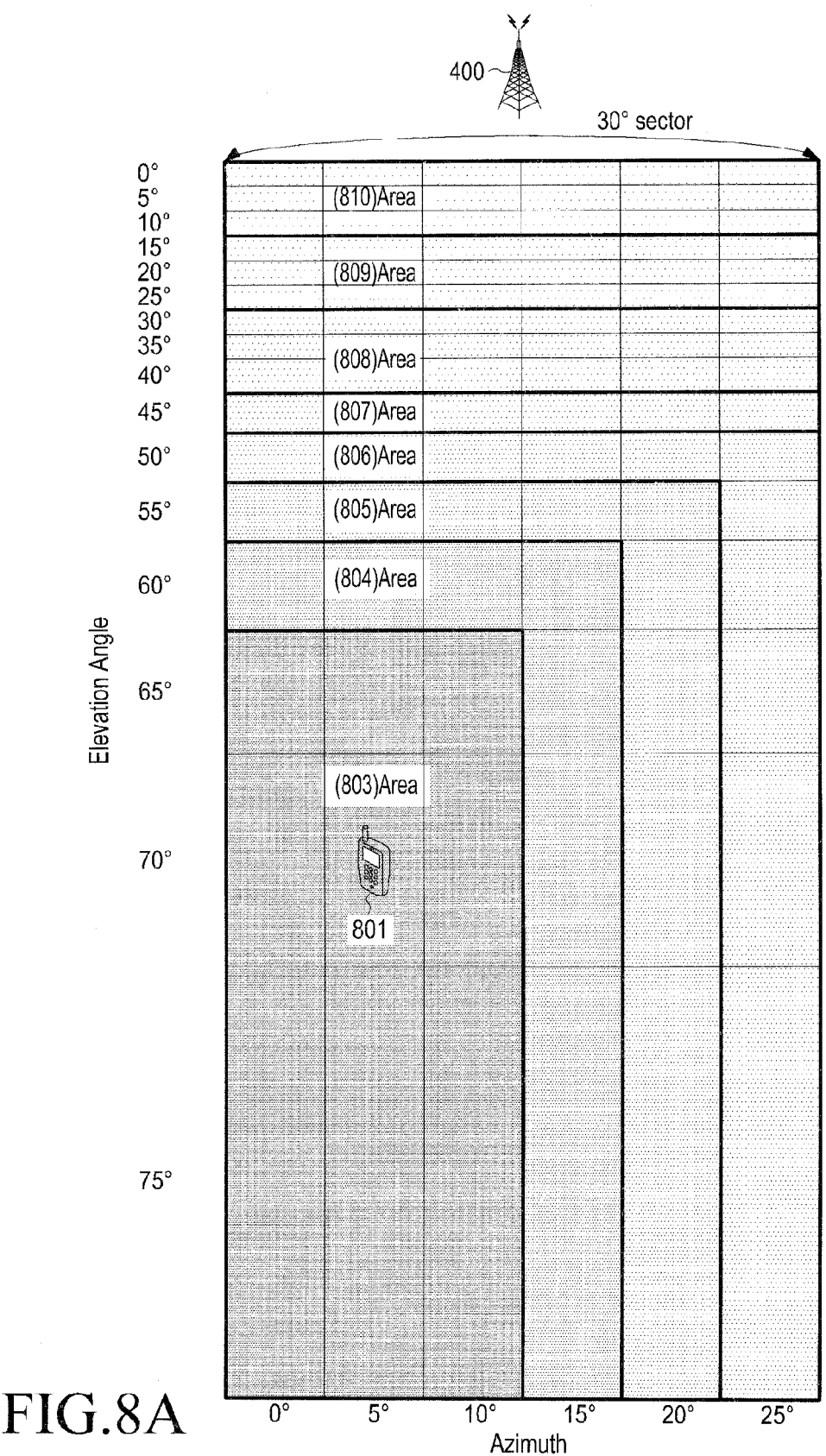
FIGS. 8A and 8B illustrate an operation in which terminals report their received signal strength to a base station in a communication system according to another embodiment of the present disclosure.
Figure 8B:
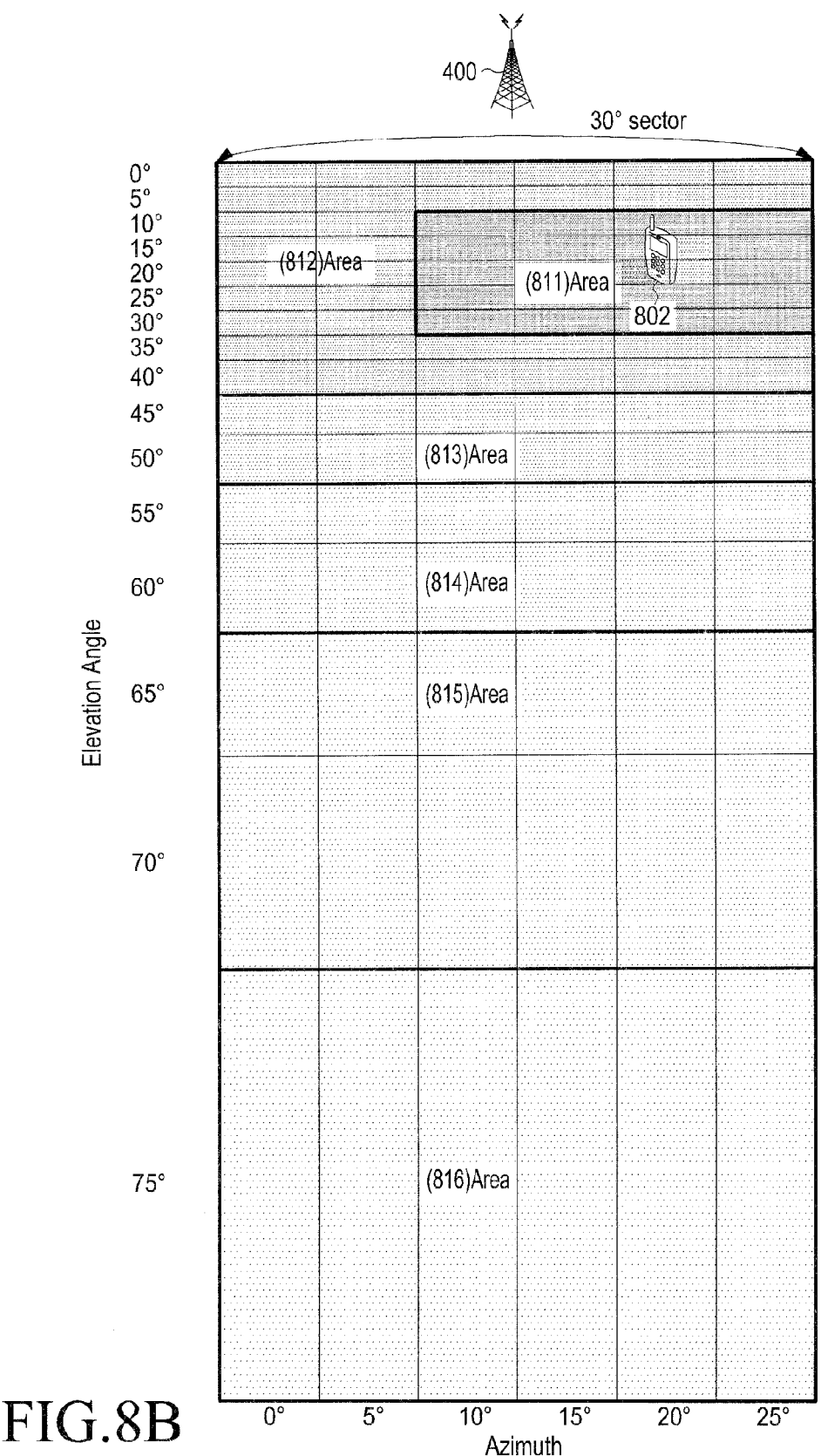

FIGS. 8A and 8B illustrate an operation in which terminals 801 and 802 report their received signal strength to a base station 400 in a communication system according to another embodiment of the present disclosure.

Referring to FIGS. 8A and 8B, the terminal #1 801 may report received signal strengths of different reference signals for eight areas including the terminal 801's area 803 up to an area 810 which is quite distanced from the area 803. A terminal #2 802 may also report received signal strengths of different reference signals for six areas including the terminal 802's area 811 and areas 812 to 816 which are respectively further away from the area 811. As illustrated in FIGS. 8A and 8B, as received signal strength of a reference signal for a specific area is higher, the area is expressed darker. For the terminal #1 801, a reference signal for the area 803 is received with the highest signal strength, and a reference signal for an area 804 is received with the second highest signal strength. In this way, in terms of the signal strength at which a reference signal is received, the area 804 is higher than area 805, the area 805 is higher than an area 806, the area 806 is higher than an area 807, the area 807 is higher than an area 808, the area 808 is higher than an area 809, and the area 809 is higher than the area 810. For the terminal #2 802, a reference signal for the area 811 is received with the highest signal strength, and a reference signal for the area 816 is received with the lowest signal strength.

If the base station 400 schedules direct communication for the terminal #2 802 upon receiving reports on received signal strengths of Tx beam-specific reference signals from the terminal #1 801 and the terminal #2 802, the base station 400 may select a Tx beam whose received signal strength is lower than or equal to a threshold, or whose received signal strength compared to that of a Tx beam used for direct communication is lower than or equal to a threshold, among its Tx beams, received signal strengths for which have been reported by the terminal #2 802, thereby operating the selected Tx beam and its associated area, for local communication. For example, the base station 400 may operate the area 815 or the area 816 for local communication, and the terminal #1 801 that has reported the Tx beam corresponding to the area as the best Tx beam, may be determined as a terminal capable of local communication.

Using the Tx beam-specific received signal strength information reported by the terminal #1 801 capable of local communication, the base station 400 determines whether to operate local communication for the associated area. For the Tx beam used for local communication with the terminal #2 802, the terminal #1 801 has reported low received signal strength for the reference signal, and if the received signal strength is lower than or equal to a threshold, or is lower by a threshold than or equal to the highest received signal strength reported by the terminal #1 801, the base station 400 may determine the area 803 where the terminal #1 801 is located, as an area where local communication is available.

In a case where the base station 400 has operated local communication for the area 803, upon receiving this information, the terminal #1 801 may determine that the terminal #1 801 is a terminal capable of local communication, if the Tx beam corresponding to the area 803 among the Tx beams of the base station 400 has the highest received signal strength. Alternatively, the terminal #1 801 may compare the received signal strength of the Tx beam corresponding to the area 803 with the highest received signal strength of the Tx beam, and determine that the terminal #1 801 is a terminal capable of local communication, if the comparison results fall within a predetermined value.

The base station 400 transmits information about the time, space, and frequency resources operated for local communication to the terminals located in the space resources where local communication is available. To this end, the base station 400 may form a Tx beam having a beam width corresponding to the space, and transmit scheduling information for the time, space and frequency resources using the formed Tx beam. The scheduling information may be transmitted over a scheduling channel or in a separately defined resource area. The scheduling information may be transmitted to a plurality of terminals in a broadcast or multicast manner, rather than being transmitted to each terminal in a unicast manner.

Figure 9:
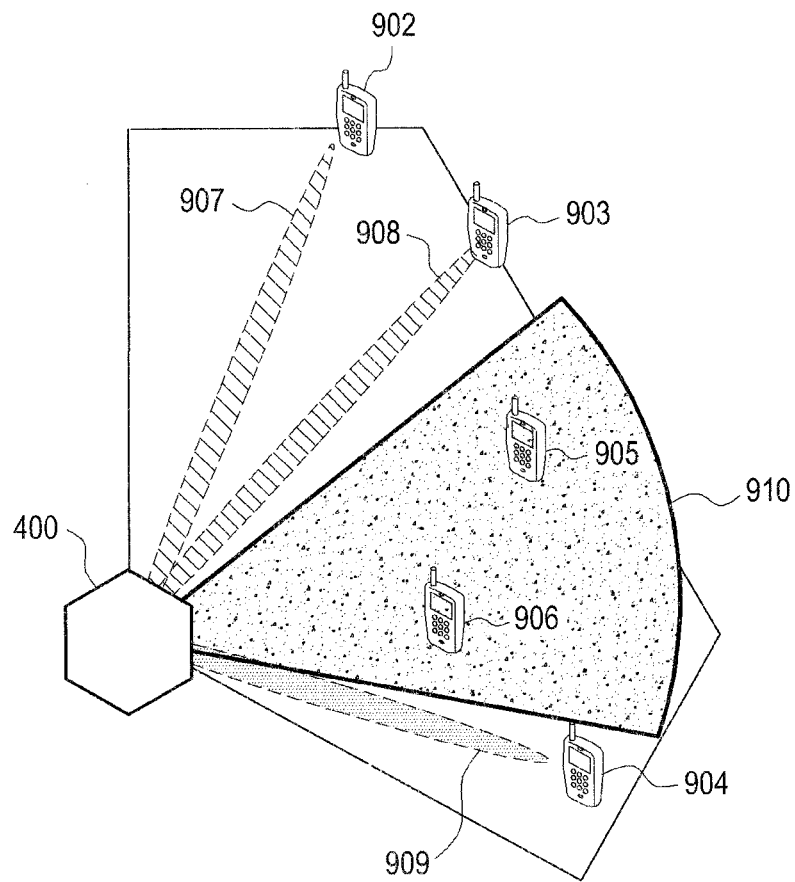
FIG. 9 illustrates an operation in which a base station transmits scheduling information to different terminals using different beam widths in a communication system according to an embodiment of the present disclosure.

FIG. 9 illustrates an operation in which a base station transmits scheduling information to different terminals using different beam widths in a communication system according to an embodiment of the present disclosure.

Referring to FIG. 9, when scheduling direct communication, the base station 400 delivers scheduling information to terminals using fine Tx beams. For example, the base station 400 delivers scheduling information to terminals 902, 903, and 904 that perform direct communication with the base station 400, using fine Tx beams 907, 908, and 909, respectively. On the other hand, if the base station 400 delivers scheduling information to terminals 905 and 906 that perform local communication with each other, using fine Tx beams one by one, a lot of base station resources may be consumed for the delivery of scheduling information. Therefore, the base station 400 may deliver scheduling information using one Tx beam 910 having a beam width corresponding to an area where local communication is available.

The base station 400 may transmit scheduling information for the time, space, and frequency resources operated for local communication, over a broadcast channel.

The scheduling information for local communication may include information about the time, space, and frequency resources allocated for inter-terminal communication or relay communication. The spatial information may include information about one or more coarse beams or one or more fine beams that the base station 400 will allocate for local communication.

Figure 10:
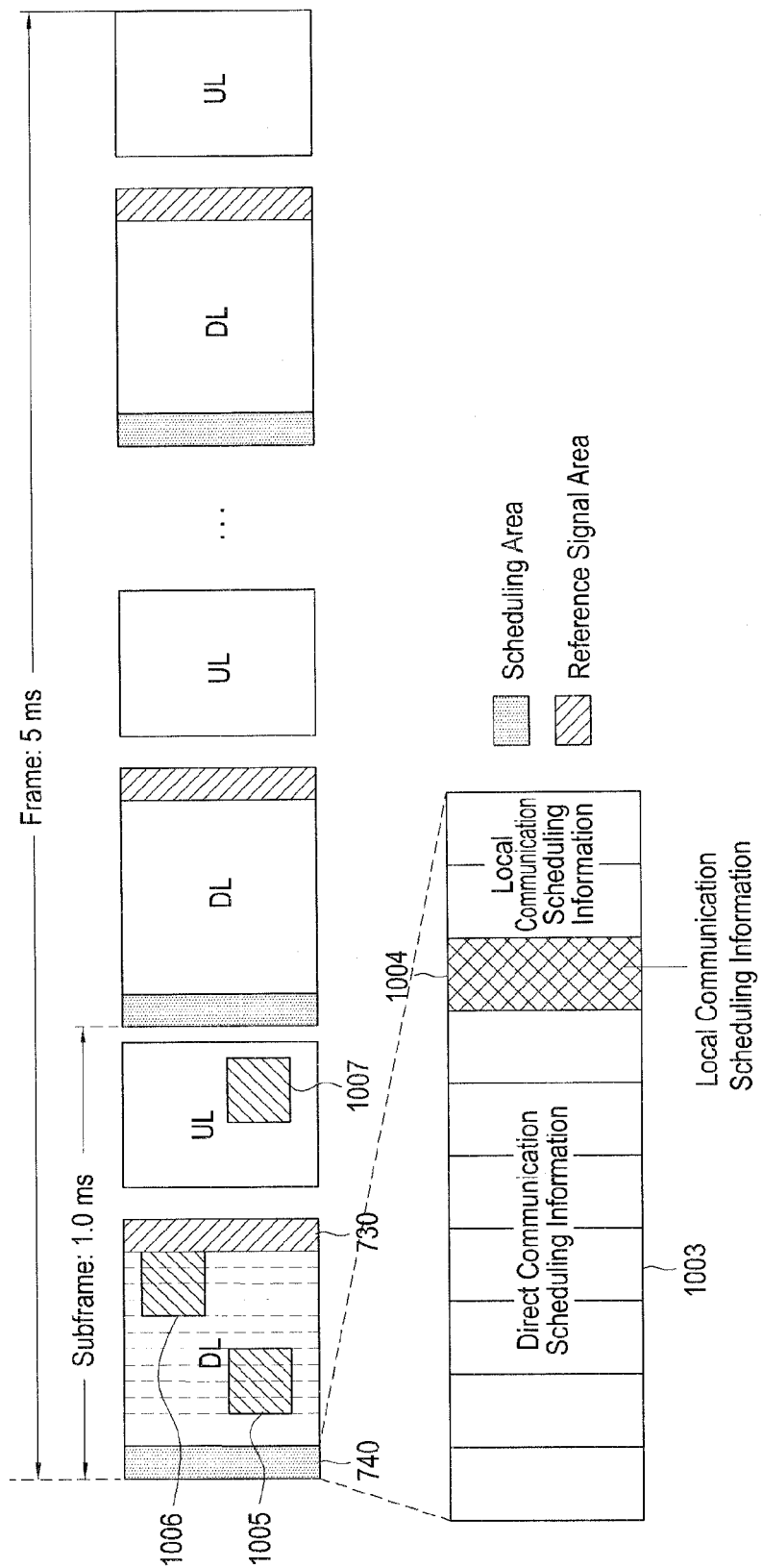
FIG. 10 illustrates a frame structure designed to transmit scheduling information for the time, space and frequency resources used for local communication, over a scheduling channel in a communication system according to an embodiment of the present disclosure.

FIG. 10 illustrates a frame structure designed to transmit scheduling information for time, space and frequency resources used for local communication, over a scheduling channel in a communication system according to an embodiment of the present disclosure.

Referring to FIG. 10, a base station 400 may transmit scheduling information for direct communication and local communication in a scheduling area 740 of each sub-frame. The scheduling area 740 may be comprised of ten scheduling units, and includes an area 1003 used to transmit scheduling information for direct communication and an area 1004 used to transmit scheduling information for local communication.

The scheduling information for direct communication may be transmitted using fine Tx beams, while the scheduling information for local communication may be transmitted using a Tx beam having a beam width corresponding to the area where local communication is available. The scheduling information for local communication may include information about the time, space, and frequency resources allocated for inter-terminal communication or relay communication, and information about one or more different areas 1005, 1006, and 1007 in the time and frequency resources. The scheduling information for local communication may also include information about one or more coarse or fine Tx beams allocated for local communication.

Upon receiving the scheduling information for local communication, a terminal may determine whether the terminal is capable of local communication, based on the received scheduling information. The terminal may determine that the terminal is capable of local communication, if the scheduling information for local communication includes a Tx beam measured by the terminal and having the highest received signal strength among the DL Tx beams of the base station 400. Alternatively, the terminal may compare the received signal strength of the Tx beam, which is included in scheduling information for local communication, with received signal strength of a Tx beam showing the highest received signal strength among the signals the terminal has received, and may determine that the terminal is capable of local communication, if the comparison results fall within a predetermined value.

In a case where a terminal capable of local communication exchanges local communication data with another terminal in the time, space, and frequency resources operated for local communication, upon receiving scheduling information for local communication from the base station 400, the terminal may transmit the received scheduling information to another terminal which has failed to receive the scheduling information from the base station 400 due to obstacles and the like.

Figure 11:
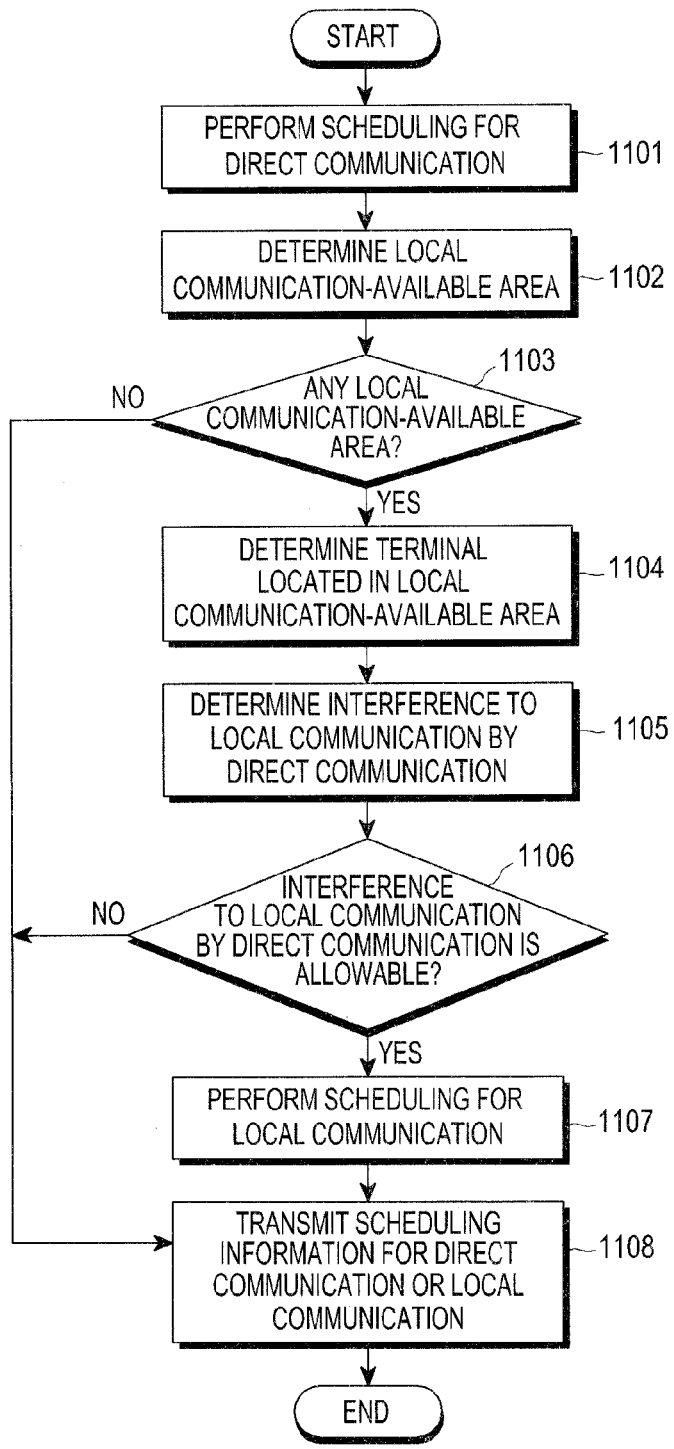
FIG. 11 is a flowchart illustrating an operation of a base station in a communication system according to an embodiment of the present disclosure.

FIG. 11 is a flowchart illustrating an operation of a base station 400 in a communication system according to an embodiment of the present disclosure.

Referring to FIG. 11, the base station 400 performs scheduling for direct communication on a plurality of terminals using one or more Tx/Rx beams at operation 1101. Thereafter, based on information about the Tx beam-specific received signal strength of the base station 400, that the terminals in the base station 400's cell have reported, the base station 400 determines an area where local communication is available using Tx/Rx beams whose interference to the Tx/Rx beams used for direct communication is lower than or equal to a predetermined threshold at operation 1102. The base station 400 may determine, as an area where local communication is available, the area corresponding to a Tx beam whose received signal strength is lower than or equal to a predetermined value, if received signal strength of Tx beams of the base station 400, that the terminals, for which direct communication is scheduled, have measured and reported, is lower than or equal to a predetermined threshold. Alternatively, the base station 400 may compare the reported received signal strength with the received signal strength of the Tx beam used for direct communication, and determine, as an area where local communication is available, the area corresponding to a Tx beam whose received signal strength is lower than or equal to a predetermined value, if the comparison results fall within a predetermined value.

After determining the area where local communication is available, the base station 400 may determine the terminal that is located in the area and is capable of local communication, and may allocate resources for local communication taking into account the interference, by which direct communication may affect local communication if the local communication is allowed.

If there is no area where local communication is available at operation 1103, the base station 400 transmits scheduling information for direct communication and ends the scheduling operation at operation 1108. On the other hand, if there is an area where local communication is available at operation 1103, the base station 400 determines a terminal located in the area where local communication is available, using the information about its Tx beam-specific received signal strength that terminals in its cell have reported at operation 1104. The base station 400 may determine that the terminal is capable of local communication, if the terminal reports a Tx beam corresponding to the area where local communication is available, as a Tx beam having the highest received signal strength. Alternatively, the base station 400 may compare the received signal strength of the Tx beam corresponding to the area where local communication is available, which the terminal has reported, with the highest received signal strength of the Tx beam among the signals transmitted from the base station 400, and may determine the terminal as a terminal capable of local communication, if the comparison results fall within a predetermined value.

When the base station 400 has allowed local communication using the information about the base station 400's Tx beam-specific received signal strength that the terminals capable of local communication have reported, the base station 400 determines interference by which the direct communication may affect local communication at operation 1105. The base station 400 may regard the interference by which direct communication may affect local communication, as an allowable level, if the received signal strength of Tx beams scheduled for direct communication is lower than or equal to a predetermined value in the information about the Tx beam-specific received signal strength that the terminals capable of local communication have reported. Alternatively, if received signal strength of Tx beams scheduled for direct communication is equal to or lower by a predetermined value than the received signal strength of the Tx beam having the highest received signal strength among the signals the terminal receives, the base station 400 may regard the interference by which direct communication may affect local communication, as an allowable level, even though the terminal performs local communication.

If the interference by which direct communication may affect local communication is not regarded as an allowable level at operation 1106, the base station 400 transmits scheduling information for direct communication to terminals without scheduling for local communication and ends the scheduling operation at operation 1108.

On the other hand, if the interference by which direct communication may affect local communication is regarded as an allowable level even though local communication is performed at operation 1106, the base station 400 schedules the time, space, and frequency resources for local communication to the terminals determined to be able to perform local communication at operation 1107. The space resources operated for local communication may include all or some of the candidate area where local communication is available. The frequency resources operated for local communication may include frequency resources selected to minimize interference in the frequency area between Tx beams operated for local communication and adjacent Tx beams scheduled for direct communication, or all of the available frequency resources.

The base station 400 transmits scheduling information for direct communication or local communication over a scheduling channel or a broadcast channel and ends the scheduling operation at operation 1108.

Figure 12:
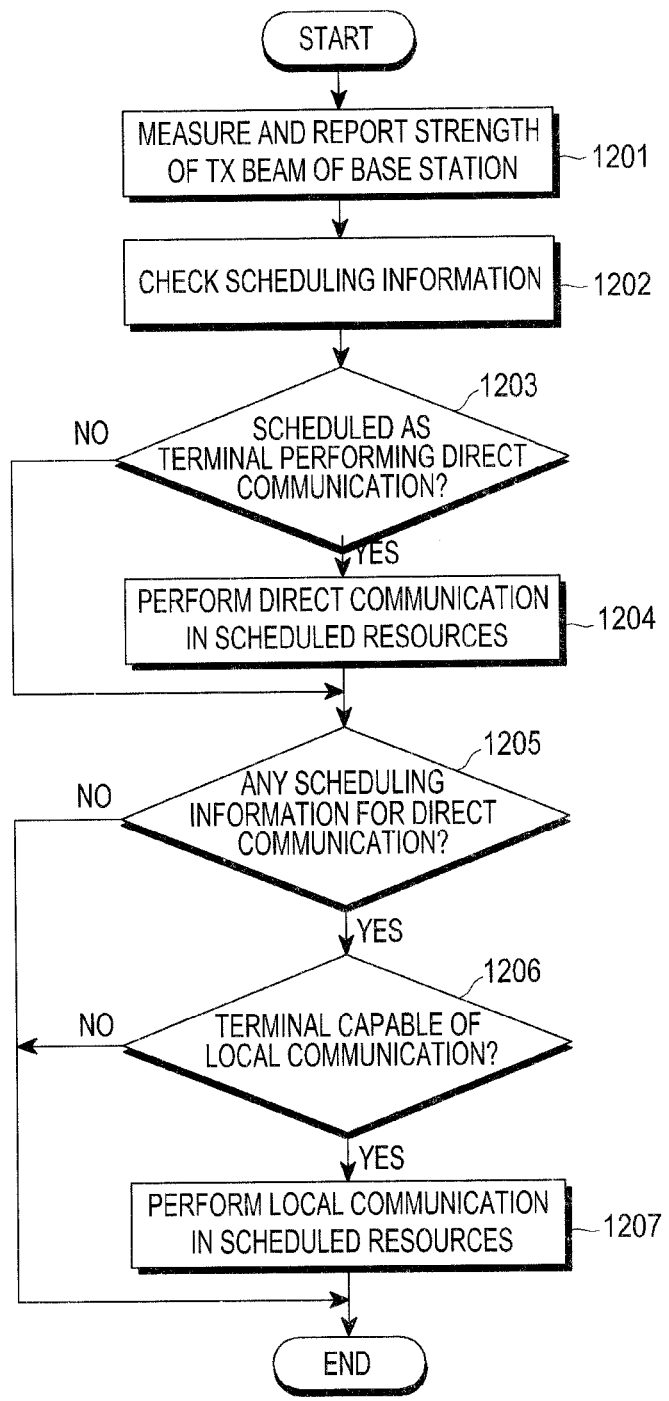
FIG. 12 is a flowchart illustrating an operation of a terminal in a communication system according to an embodiment of the present disclosure.

FIG. 12 is a flowchart illustrating an operation of a terminal in a communication system according to an embodiment of the present disclosure.

Referring to FIG. 12, a terminal in the cell serviced by the base station 400 measures received signal strength of a Tx beam transmitted from the base station 400, and reports the measurement results to the base station 400 at operation 1201. Thereafter, the terminal checks scheduling information in the scheduling area of a sub-frame received from the base station 400 at operation 1202.

The terminal determines if scheduling information for direct communication in the scheduling area is available. If the terminal is scheduled as a terminal performing direct communication at operation 1203, the terminal performs direct communication in the scheduled resources at operation 1204.

On the other hand, if the terminal is not scheduled as a terminal performing direct communication at operation 1203, the terminal determines if scheduling information for local communication in the scheduling area is available. If scheduling information for local communication in the scheduling area is available at operation 1205, the terminal determines if the terminal is a terminal capable of local communication. If the terminal is a terminal capable of local communication at operation 1206, the terminal performs local communication in the time, space, and frequency resources scheduled for local communication at operation 1207.

The terminal may determine whether the terminal is a terminal capable of local communication, based on, for example, the reception of scheduling information for the local communication. The terminal may determine that the terminal if a terminal for local communication, if the Tx beam measured by the terminal and having the highest received signal strength among the DL Tx beams of the base station 400 is included in the scheduling information for local communication, or if the received signal strength of the Tx beam for local communication included in the scheduling information for local communication is lower by a predetermined value than the received signal strength of the Tx beam measured by the terminal and showing the optimal reception performance.

Figure 13:
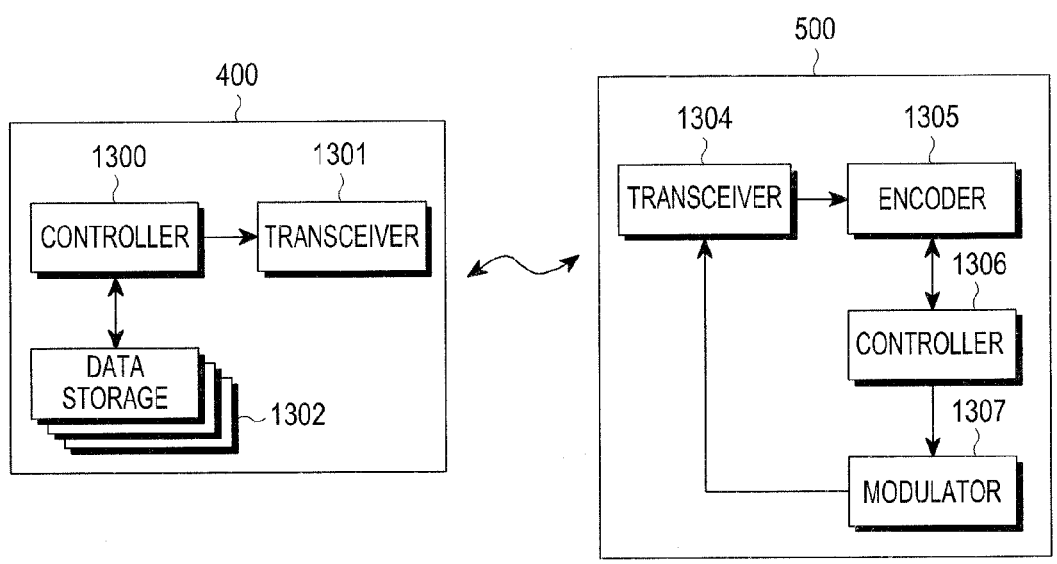
FIG. 13 illustrates structures of a base station and a terminal in a communication system according to another embodiment of the present disclosure.

FIG. 13 illustrates structures of a base station 400 and a terminal 500 in a communication system according to another embodiment of the present disclosure.

Referring to FIG. 13, the base station 400 includes a controller 1300, a transceiver 1301, and a data storage 1302. The terminal 500 includes a transceiver 1304, an encoder 1305, a controller 1306, and a modulator 1307, and may perform the above-described terminal's functions.

In the base station 400, the transceiver 1301 transmits and/or receives signals to/from the terminal 500, the data storage 1302 stores data, and the controller 1300 controls the overall operation of the base station 400 such as scheduling direct communication and local communication.

In the terminal 500, the transceiver 1304 transmits and/or receives signals to/from the base station 400, the encoder 1305 encodes received signals, and the modulator 1307 modulates the encoded signals. The controller 1306 controls the overall operation of the terminal 500 such as measuring and reporting received signal strengths of Tx beams of the base station 400.

As is apparent from the foregoing description, resources for direct communication between a base station and a terminal, and resources for local communication between terminals without a base station may be efficiently operated in a communication system, contributing to an increase in the efficiency of transmission and reception.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for operating resources by a base station in a communication system, the method comprising:
    transmitting at least one beam to at least one terminal;
    receiving strength information of the at least one beam from the at least one terminal;
    determining at least one resource which is not used for communication between the at least one terminal and the base station, and resources, whose interference to communication between the base station and the at least one terminal is less than or equal to a predetermined threshold, based on the strength information of the at least one beam; and
    allocating the determined resources as resources for communication which is performed between terminals without the base station.

2. The method of claim 1, wherein the determining of the at least one resource comprises:
    determining resources, whose interference to communication between the base station and the at least one terminal is less than or equal to a predetermined threshold, based on at least one of time resources, space resources, and frequency resources.

3. The method of claim 2, wherein the space resources are determined based on at least one of physical space information, Multiple Input Multiple Output (MIMO) layer information, antenna configuration information of a transceiver, and different beamforming information of a transceiver.

4. The method of claim 1, wherein the determining of the at least one resource comprises:
determining resources, whose interference to communication between the base station and the at least one terminal is less than or equal to a predetermined threshold, based on a received signal strength of a beam which is allocated for communication between the base station and the at least one terminal and a received signal strength of a beam which is not allocated for communication between the base station and the at least one terminal.

5. The method of claim 1, wherein the allocating of the determined resources comprises:
allocating the determined resources for communication which is performed between a terminal and the base station via at least one other terminal.

6. The method of claim 1, wherein the resources for communication which is performed between terminals without the base station are adaptively changed according to a communication environment.

7. The method of claim 1, further comprising:
transmitting resource allocation information to the at least one terminal,
wherein the transmitting of the resource allocation information comprises transmitting the resource allocation information to a terminal that directly communicates with the base station, using a fine beam, and transmitting the resource allocation information to a terminal that communicates with another terminal without the base station, using a beam having a beam width corresponding to an area in which the terminal can communicate with the other terminal without the base station.

8. The method of claim 1, wherein the resources for communication which is performed between terminals without the base station, comprise at least one of time, space, and frequency resources.

9. A method for operating resources by a terminal in a communication system, the method comprising:
receiving at least one beam from a base station;
measuring a strength of the at least one beam;
transmitting information about the strength of the at least one beam to the base station; and
receiving, from the base station, at least one resource which is not used for communication between at least one terminal and the base station and resources whose interference to communication between the base station and the at least one terminal is less than or equal to a predetermined threshold,
wherein the at least one resource is determined and allocated by the base station based on the information about the strength of the at least one beam.

10. The method of claim 9, further comprising:
determining whether the terminal is a terminal that can communicate with another terminal without the base station,
wherein the determining of whether the terminal is a terminal that can communicate with the other terminal comprises determining whether the beam strength information includes information about a beam that the terminal has received from the base station with a highest received signal strength.

11. The method of claim 9, further comprising:
determining whether the terminal is a terminal that can communicate with another terminal without the base station,
wherein the determining of whether the terminal is a terminal that can communicate with the other terminal comprises determining whether strength of a beam received by the terminal in the beam strength information is less by a predetermined value than strength of a beam that the terminal has received from the base station with a highest received signal strength.

12. The method of claim 9, further comprising transmitting resource allocation information received from the base station to another terminal that has failed to receive the resource allocation information from the base station, if the terminal is a terminal that can communicate with another terminal without the base station.

13. An apparatus for operating resources by a base station in a communication system, the apparatus comprising:
a transmitter configured to transmit at least one beam to at least one terminal;
a receiver configured to receive strength information of the at least one beam from the at least one terminal; and
a controller configured to:
determine at least one resource which is not used for communication between the at least one terminal and the base station,
determine resources, whose interference to communication between the base station and the at least one terminal is less than or equal to a predetermined threshold, based on the strength information of the at least one beam, and
allocate the determined resources as resources for communication which is performed between terminals without the base station.

14. The apparatus of claim 13, wherein the controller is configured to determine resources, whose interference to communication between the base station and the at least one terminal is less than or equal to a predetermined threshold, based on at least one of time resources, space resources, and frequency resources.

15. The apparatus of claim 14, wherein the space resources are determined using at least one of physical space information, Multiple Input Multiple Output (MIMO) layer information, antenna configuration information of a transceiver, and different beamforming information of a transceiver.

16. The apparatus of claim 13, wherein the controller is configured to:
determine resources, whose interference to communication between the base station and the at least one terminal is less than or equal to a predetermined threshold, based on a received signal strength of a beam which is allocated for communication between the base station, and
determine the at least one terminal and a received signal strength of a beam which is not allocated for communication between the base station and the at least one terminal.

17. The apparatus of claim 13, wherein the controller is configured to allocate the determined resources for communication which is performed between a terminal and the base station via at least one other terminal.

18. The apparatus of claim 13, wherein the resources for communication which is performed between terminals without the base station are adaptively changed according to a communication environment.

19. The apparatus of claim 13, wherein the controller is configured to:
- transmit resource allocation information to the at least one terminal, and
- transmit the resource allocation information to a terminal that directly communicates with the base station, using a fine beam, and
- transmit the resource allocation information to a terminal that communicates with another terminal without the base station, using a beam having a beam width corresponding to an area where the terminal can communicate with the other terminal without the base station.

20. The apparatus of claim 13, wherein the resources for communication which is performed between terminals without the base station, comprise at least one of time, space, and frequency resources.

21. An apparatus for operating resources by a terminal in a communication system, the apparatus comprising:
- a receiver configured to receive at least one beam from a base station;
- a transmitter configured to measure a strength of the at least one beam, and to transmit information about the strength of the at least one beam to the base station; and
- a controller configured to:
  - receive, from the base station, at least one resource which is not used for communication between at least one terminal and the base station and resources whose interference to communication between the base station and the at least one terminal is less than or equal to a predetermined threshold, and
  - control communication with another terminal based on the received resources,
- wherein the at least one resource is determined and allocated by the base station based on the information about the strength of the at least one beam.

22. The apparatus of claim 21, wherein the controller is configured to determine whether the terminal is a terminal that can communicate with another terminal without the base station, based on whether the beam strength information includes information about a beam that the terminal has received from the base station with a highest received signal strength.

23. The apparatus of claim 21, wherein the controller is configured to determine whether the terminal is a terminal that can communicate with another terminal without the base station, based on whether strength of a beam received by the terminal in the beam strength information is less by a predetermined value than strength of a beam that the terminal has received from the base station with a highest received signal strength.

24. The apparatus of claim 21, wherein the controller is configured to transmit resource allocation information received from the base station to another terminal that has failed to receive the resource allocation information from the base station, if the terminal is a terminal that can communicate with another terminal without the base station.

* * * * *